Oct. 22, 1963  E. HERMANNI  3,108,152
FOUR MEMBER OBJECTIVE LENS
Filed Dec. 28, 1960
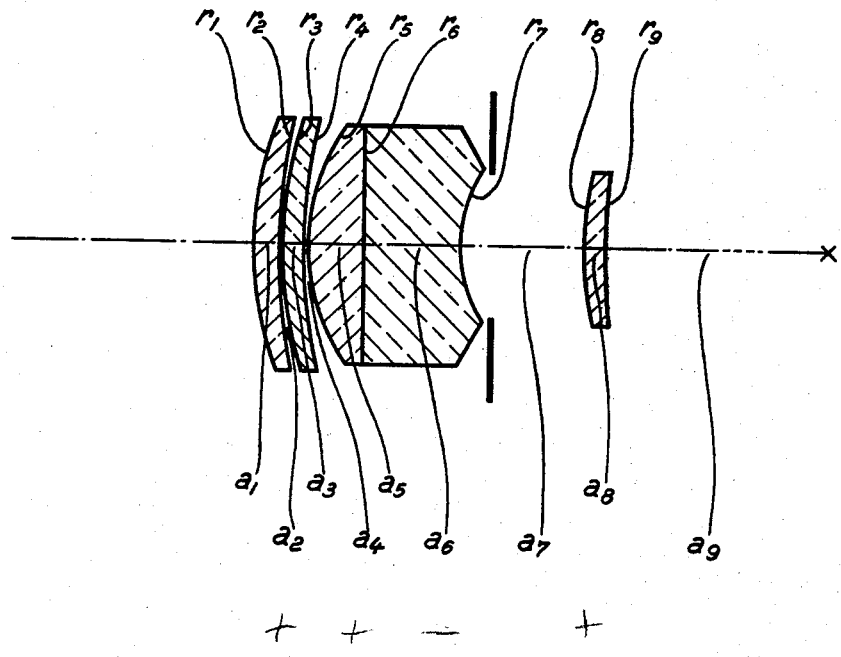
INVENTOR:
EUGEN HERMANNI
BY
AGENT

3,108,152
FOUR MEMBER OBJECTIVE LENS

Eugen Hermanni, Katzenfurt, Dilkreis, Germany, assignor to Ernst Leitz G.m.b.H., Optische Werke, Wetzlar, Germany, a corporation of Germany
Filed Dec. 28, 1960, Ser. No. 91,294
Claims priority, application Germany Jan. 2, 1960
2 Claims. (Cl. 88—57)

The present invention relates to an objective lens with a large focal length for receiving and reproducing an image, which has a relative aperture or speed of at least $f:2.8$ and a large distance between the back lens and image. The lens of this invention belongs to the class of objectives wherein a cemented meniscus lens is arranged between positive lenses.

A large distance between the back lens and the image (back focal distance) has been produced with such an objective by placing an intermediate lens member of an axial thickness smaller than 0.2 of the focal length between two simple lens members, the relationship of the radii $r_1$, $r_2$ and $r_3$ of the surface of the first simple lens, the surface of the intermediate lens and the surface of the third simple lens, respectively being $$\frac{4}{f} < \frac{1}{r_1} + \frac{1}{r_3} - \frac{1}{r_2} < \frac{6.3}{f}$$

It is one object of the present invention to provide an improved objective lens of a large back focal length. Other objects of the present invention and advantageous features thereof will become apparent as the description proceeds.

In accordance with the invention, two positive meniscus lens members are arranged ahead of the cemented negative meniscus lens member in the direction of the longer distance between back lens and image (back focal distance), the meniscus members being separated by thin air lenses. The radius $r_3$ of the front surface of the second positive meniscus member is larger than the radius $r_5$ of the front surface of the negative meniscus member, the front radii $r_1$ of the first positive meniscus lens member, $r_3$ of the second positive meniscus lens member and $r_5$ of the negative meniscus lens member having the following relation:

$$\frac{2.5}{f} < \frac{1}{r_1} - \frac{1}{r_3} + \frac{1}{r_5} < \frac{4.5}{f}$$

Furthermore, the axial thickness of the negative cemented meniscus lens member is larger than $0.2f$, which $f$ is the total focal length of the objective lens. The glasses used for the first three positive lenses may have an Abbé number $v_e$ larger than 60.

Throughout the specification and the claims, the reference to "front" and "back," as well as first, second, etc., is taken in relation to the incoming light beam.

The accompanying drawing illustrates an objective lens according to the invention, the following tables giving two specific examples of such lenses, taken in conjunction with the accompanying drawing wherein the first positive meniscus lens member is defined by its front radius $r_1$, its axial thickness $a_1$, and its back radius $r_2$; the second positive meniscus lens member is defined by its front radius $r_3$, its axial thickness $a_3$, and its back radius $r_4$; the cemented negative meniscus lens member is defined by its front radius $r_5$, the radius of the cemented interface $r_6$, the back radius $r_7$, the axial thickness $a_5$ of its first lens and the axial thickness $a_6$ of its second lens cemented to the first lens, and the back lens at the other side of the aperture is defined by its front radius $r_8$, its axial thickness $a_8$ and its back radius $r_9$. The first air lens between the first and second positive meniscus lens members has an axial thickness $a_2$. The second air lens between the second positive meniscus lens member and the negative meniscus lens member has an axial thickness $a_4$. The axial distance between the negative meniscus lens member and the back lens is designated as $a_7$ and the distance from the back lens to the image receiving surface is $a_9$.

In the following tables, $n_e$ designates the refraction indices and $v_e$ the Abbé numbers, both related to the $e$-line.

Table I

[Focal length $f=1.00$ Relative aperture 1:2.8. Image angle 18°]

|  |  |  | $n_e$ | $v_e$ |
|---|---|---|---|---|
| $r_1$ | +0.57227 | | | |
| | | $a_1$ 0.0365 | 1.6240 | 63.2 |
| $r_2$ | +0.94533 | | | |
| | | $a_2$ 0.0020 | | |
| $r_3$ | +0.57227 | | | |
| | | $a_3$ 0.0365 | 1.6240 | 63.2 |
| $r_4$ | +0.94533 | | | |
| | | $a_4$ 0.0020 | | |
| $r_5$ | +0.30096 | | | |
| | | $a_5$ 0.0768 | 1.5187 | 64.0 |
| $r_6$ | −3.50074 | | | |
| | | $a_6$ 0.1400 | 1.6241 | 36.1 |
| $r_7$ | +0.19704 | | | |
| | | $a_7$ 0.1770 | | |
| $r_8$ | +0.50515 | | | |
| | | $a_8$ 0.0280 | 1.6688 | 35.6 |
| $r_9$ | +1.33061 | | | |
| | | $a_9$ 0.4716 | | |

The sum of the axial lengths $a_1$ to $a_6$ is 0.2938 and the value of the sum of the reciprocal radii is 3.32.

Table II

[Focal length $f=1.00$ Relative aperture 1:2.8. Image angle 18°]

|  |  |  | $n_e$ | $v_e$ |
|---|---|---|---|---|
| $r_1$ | +0.62637 | | | |
| | | $a_1$ 0.5000 | 1.62303 | 60.1 |
| $r_2$ | +1.08410 | | | |
| | | $a_2$ 0.00060 | | |
| $r_3$ | +0.45154 | | | |
| | | $a_3$ 0.04200 | 1.62303 | 60.1 |
| $r_4$ | +0.67283 | | | |
| | | $a_4$ 0.00060 | | |
| $r_5$ | +0.30417 | | | |
| | | $a_5$ 0.07378 | 1.55897 | 58.3 |
| $r_6$ | ∞ | | | |
| | | $a_6$ 0.13120 | 1.67764 | 32.0 |
| $r_7$ | +0.19572 | | | |
| | | $a_7$ 0.16700 | | |
| $r_8$ | +0.51413 | | | |
| | | $a_8$ 0.02800 | 1.69416 | 30.9 |
| $r_9$ | +1.41901 | | | |
| | | $a_9$ 0.4812 | | |

While specific examples of objective lenses according to the present invention have been set forth for purposes of illustration, it should be clearly understood that many variations and modifications may occur to the skilled in the art after benefiting from the present teaching and without departing from the spirit and the scope of the invention as defined in the appended claims.

I claim:
1. An objective lens comprising a first positive meniscus lens member having a front radius $r_1$, an axial thickness $a_1$, and a back radius $r_2$, a second positive meniscus lens member having a front radius $r_3$, an axial thickness $a_3$, and a back radius $r_4$, the two positive meniscus lens members being separated by a thin air lens having an axial thickness $a_2$, a negative cemented meniscus lens member consisting of a first lens and a second lens cemented together at an interface with a radius $r_6$, the first lens having a front radius $r_5$ and an axial thickness $a_5$, and the second lens having a back radius $r_7$ and an axial thickness $a_6$, the second positive meniscus lens member and the first lens of the negative meniscus lens member being separated by a thin air lens having an axial thick- ness $a_4$, said meniscus lens members being arranged on one side of the aperture and a back lens on the other side of the aperture, the back lens having an axial thickness $a_8$, a front radius $r_8$, and a back radius $r_9$, the axial distance between the negative meniscus lens member and the back lens being $a_7$ and the axial distance from the back lens to the image receiving surface being $a_9$, the objective lens having the following parameters, related to the $e$-line:

[Focal length $f=1$. Relative aperture 1:2.8. Image angle 18°]

|  |  |  | $n_e$ | $v_e$ |
|---|---|---|---|---|
| $r_1$ | +0.57227 | $a_1$ 0.0365 | 1.6240 | 63.2 |
| $r_2$ | +0.94533 | $a_2$ 0.0020 | ------ | ---- |
| $r_3$ | +0.57227 | $a_3$ 0.0365 | 1.6240 | 63.2 |
| $r_4$ | +0.94533 | $a_4$ 0.0020 | ------ | ---- |
| $r_5$ | +0.30096 | $a_5$ 0.0768 | 1.5187 | 64.0 |
| $r_6$ | −3.50074 | $a_6$ 0.1400 | 1.6241 | 36.1 |
| $r_7$ | +0.19704 | $a_7$ 0.1770 | ------ | ---- |
| $r_8$ | +0.50515 | $a_8$ 0.0280 | 1.6688 | 35.6 |
| $r_9$ | +1.33061 | $a_9$ 0.4716 | ------ | ---- |

2. An objective lens comprising a first positive meniscus lens member having a front radius $r_1$, an axial thickness $a_1$, and a back radius $r_2$, a second positive meniscus lens member having a front radius $r_3$, an axial thickness $a_3$, and a back radius $r_4$, the two positive meniscus lens members being separated by a thin air lens having an axial thickness $a_2$, a negative cemented meniscus lens member consisting of a first lens and a second lens cemented together at an interface with a radius $r_6$, the first lens having a front radius $r_5$ and an axial thickness $a_5$, and the second lens having a back radius $r_7$ and an axial thickness $a_6$, the second positive meniscus lens member and the first lens of the negative meniscus lens member being separated by a thin air lens having an axial thickness $a_4$, said meniscus lens members being arranged on one side of the aperture and a back lens on the other side of the aperture, the back lens having an axial thickness $a_8$, a front radius $r_8$, and a back radius $r_9$, the axial distance between the negative meniscus lens member and the back lens being $a_7$ and the axial distance from the back lens to the image receiving surface being $a_9$, the objective lens having the following parameters, related to the $e$-line:

[Focal length $f=1.00$. Relative aperture 1:2.8. Image angle 18°]

|  |  |  | $n_e$ | $v_e$ |
|---|---|---|---|---|
| $r_1$ | +0.62637 | $a_1$ 0.05000 | 1.62303 | 60.1 |
| $r_2$ | +1.08410 | $a_2$ 0.00060 | ------ | ---- |
| $r_3$ | +0.45154 | $a_3$ 0.04200 | 1.62303 | 60.1 |
| $r_4$ | +0.67283 | $a_4$ 0.00060 | ------ | ---- |
| $r_5$ | +0.30417 | $a_5$ 0.07378 | 1.55897 | 58.3 |
| $r_6$ | ∞ | $a_6$ 0.13120 | 1.67764 | 32.0 |
| $r_7$ | +0.19572 | $a_7$ 0.16700 | ------ | ---- |
| $r_8$ | +0.51413 | $a_8$ 0.02800 | 1.69416 | 30.9 |
| $r_9$ | +1.41901 | $a_9$ 0.4812 | ------ | ---- |

References Cited in the file of this patent

UNITED STATES PATENTS

| 2,100,291 | Lee | Nov. 23, 1937 |
| 2,158,507 | Konig | May 16, 1939 |
| 3,033,081 | Baur et al. | May 8, 1962 |

FOREIGN PATENTS

| 565,411 | Great Britain | Nov. 9, 1944 |
| 696,167 | Great Britain | Aug. 26, 1953 |

OTHER REFERENCES

Solisch German application, 1,062,952 (KL.42L4/40), Aug. 6, 1959 (1 sht. dwg.; 2 pp. spec.).